(12) United States Patent
Marien et al.

(10) Patent No.: US 12,209,586 B2
(45) Date of Patent: Jan. 28, 2025

(54) NON-LUBRICATED SYSTEM WITH ABRADABLE SEALING ELEMENT, CORRESPONDING SEALING ELEMENT AND METHOD FOR ASSEMBLING THE SYSTEM

(71) Applicant: ATLAS COPCO AIRPOWER, NAAMLOZE VENNOOTSCHAP, Wilrijk (BE)

(72) Inventors: Karen Anna Leon Marien, Wilrijk (BE); Guido Jozef Christian Peeters, Wilrijk (BE)

(73) Assignee: ATLAS COPCO AIRPOWER NAAMLOZE VENNOOTSCHAP, Wilrijk (BE)

( * ) Notice: Subject to any disclaimer, the term of this patent is extended or adjusted under 35 U.S.C. 154(b) by 493 days.

(21) Appl. No.: 17/419,863

(22) PCT Filed: Jan. 27, 2020

(86) PCT No.: PCT/IB2020/000049
§ 371 (c)(1),
(2) Date: Jun. 30, 2021

(87) PCT Pub. No.: WO2020/157568
PCT Pub. Date: Aug. 6, 2020

(65) Prior Publication Data
US 2022/0074413 A1    Mar. 10, 2022

(30) Foreign Application Priority Data
Jan. 29, 2019    (BE) .................................. 2019/5048

(51) Int. Cl.
*F04C 27/00* (2006.01)
*F04C 18/12* (2006.01)
(Continued)

(52) U.S. Cl.
CPC ............ *F04C 27/00* (2013.01); *F04C 18/126* (2013.01); *H02K 5/10* (2013.01); *H02K 16/02* (2013.01)

(58) Field of Classification Search
CPC ............ F04C 2270/16; F04C 2240/801; F04C 27/005; F04C 15/0026; F04C 18/16;
(Continued)

(56) References Cited

U.S. PATENT DOCUMENTS

| 3,545,900 A | 12/1970 | Viner |
| 4,770,612 A * | 9/1988 | Teubler ................... F04C 14/26 418/133 |

(Continued)

FOREIGN PATENT DOCUMENTS

| CA | 2686332 C | * | 8/2014 | ............. C04B 35/00 |
| CN | 1954150 A | | 4/2007 | |

(Continued)

OTHER PUBLICATIONS

CA-2686332-C English Machine Translation (Year: 2014).*
(Continued)

*Primary Examiner* — Anthony Ayala Delgado
(74) *Attorney, Agent, or Firm* — BACON & THOMAS, PLLC

(57) ABSTRACT

A non-lubricated system for pumping a gas, includes a stationary stator with a housing that includes a rotor cavity and at least one rotatable rotor element incorporated within the rotor cavity. The stator includes at least one self-supporting sealing element, incorporated within the rotor cavity between an end face of at least one of the rotor elements and an interior wall of the housing to form a seal along the corresponding end face. At least one self-supporting sealing element is provided with an abradable coating on at least one side facing the rotor.

23 Claims, 5 Drawing Sheets

(51) Int. Cl.
  *H02K 5/10*  (2006.01)
  *H02K 16/02* (2006.01)

(58) Field of Classification Search
  CPC ...... F04C 18/126; F04C 27/00; F04C 27/007; F01C 1/12; F01C 19/00
  See application file for complete search history.

(56) References Cited

U.S. PATENT DOCUMENTS

| | | | | |
|---|---|---|---|---|
| 5,364,250 | A * | 11/1994 | Aoki | F01C 21/08 418/179 |
| 5,695,327 | A * | 12/1997 | Heinen | F01C 21/10 418/201.1 |
| 6,997,689 | B2 * | 2/2006 | Lafferty | F04C 2/086 418/206.7 |
| 2007/0217937 | A1 | 9/2007 | Sawai et al. | |
| 2009/0208357 | A1 * | 8/2009 | Garrett | F04C 2/18 29/888.023 |

FOREIGN PATENT DOCUMENTS

| | | |
|---|---|---|
| CN | 102762872 A | 10/2012 |
| CN | 103032332 A | 4/2013 |
| CN | 211852162 U | 11/2020 |
| DE | 3609996 C2 | 10/1994 |
| GB | 2138074 A | 10/1984 |
| JP | S5159908 U | 5/1976 |
| JP | S63230978 A | 9/1988 |
| WO | 8703047 A1 | 5/1987 |

OTHER PUBLICATIONS

English Translation (Year: 2014).*
International Search Report and Written Opinion in corresponding PCT Application No. PCT/IB2020/000049, dated May 7, 2020.
Chinese Office Action and Search Report in corresponding Chinese Application No. 202010078810.4, dated Oct. 10, 2022.

* cited by examiner

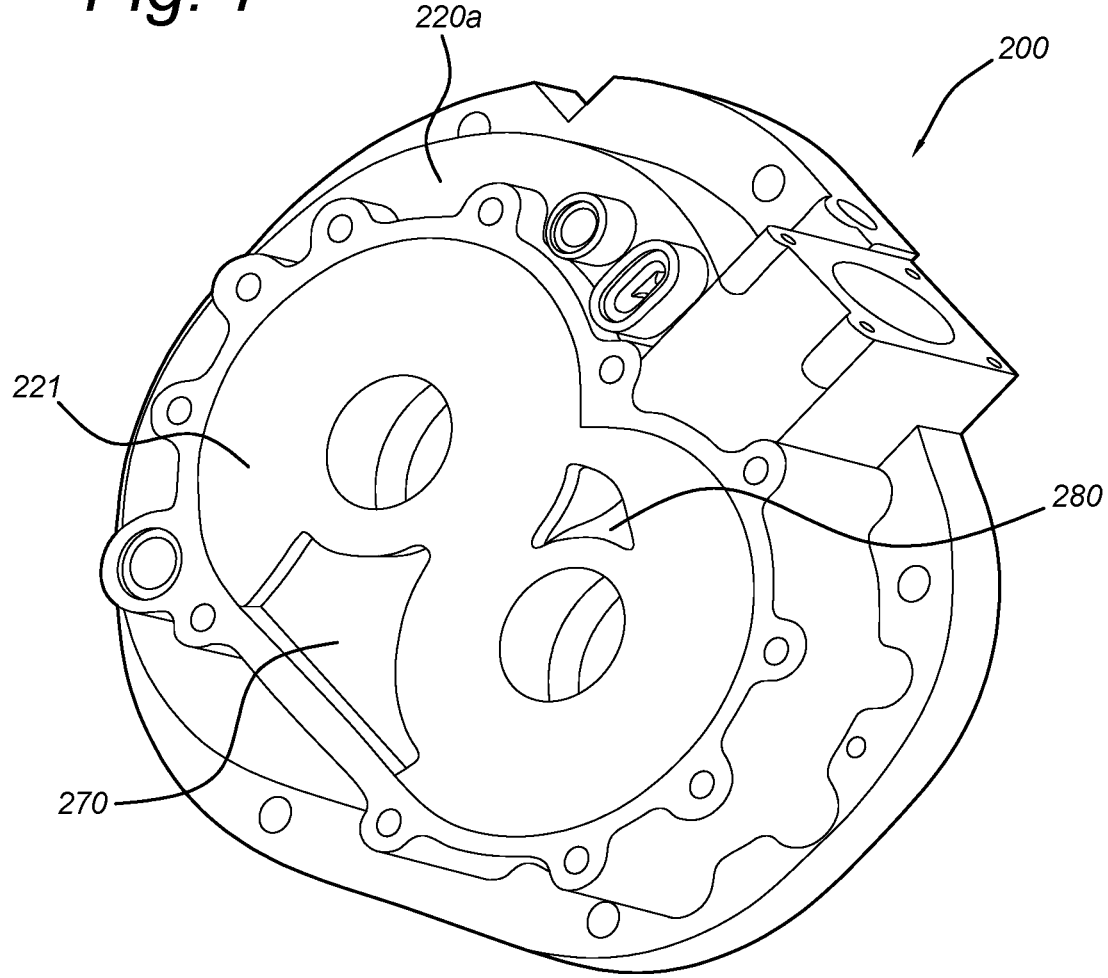

NON-LUBRICATED SYSTEM WITH ABRADABLE SEALING ELEMENT, CORRESPONDING SEALING ELEMENT AND METHOD FOR ASSEMBLING THE SYSTEM

The present invention concerns a non-lubricated system for pumping a gas, comprising a stationary stator and at least one rotatable rotor element incorporated within a rotor cavity bound by the stator. In particular, the invention relates to a compressor, vacuum pump or expander, in a non-lubricated embodiment.

BACKGROUND OF THE INVENTION

Existing compressors consist of a housing containing two rotors with a compression profile, e.g. a claw profile or a screw profile. Rotation of the rotor elements compresses the gas between these rotor elements.

With non-lubricated compressors, no liquid lubricant or sealant is introduced to create a seal between the rotors on the one hand and the rotors and housing on the other hand. To achieve this goal in the current state of the art, an abradable coating is applied to the rotor surfaces and/or the interior wall of the housing, which partially wears off during a run-in period of the compressor to create as tight a seal as possible.

However, the application of such abradable coatings takes a relatively long time, causing the use of abradable coatings to be relatively expensive.

U.S. Pat. No. 5,695,327 describes a non-lubricated screw compressor, in which sealing disks from a sintered PTFE-mica mixture are used at the end faces of the rotor elements. During operation, these sealing disks are worn by the rotor elements to such an extent, that the end faces of the rotor elements run contact-free along the sealing disks.

DE 36 09 996 C2 features a screw compressor with a disk out of a plastic deformable material placed at the end faces of the rotor elements.

Practical tests have shown that the disks from U.S. Pat. No. 5,695,327 and DE 36 09 996 C2 are less suitable to obtain an adequate seal between the end faces of the rotor elements and the housing.

SUMMARY OF THE INVENTION

One of the purposes of the invention is to provide a non-lubricated system for pumping a gas in which the sealing of the end faces of one or more rotor elements relative to the housing can be obtained in a more time- and/or cost-effective manner.

A further purpose of the invention is to provide an improved self-supporting sealing element for sealing an end face of a rotor element relative to an interior wall of the housing of a non-lubricated system. The improvement may be in the form of, for example, improved performance in higher temperature environments, improved corrosion resistance and/or improved sealing properties.

A further purpose of the invention is to provide a more time- and/or cost-effective method of assembly for a non-lubricated system for pumping a gas.

DESCRIPTION OF THE INVENTION

The first aspect of the invention concerns the provision of a non-lubricated system for pumping a gas, such as a compressor, expander or vacuum pump, comprising a stationary stator with a housing comprising a rotor cavity, with at least one rotatable rotor element incorporated within the rotor cavity, where the stator also comprises at least one self-supporting sealing element incorporated within the rotor cavity between an end face of at least one of the rotor elements and an interior wall of the housing, to form a seal along the end face. Said at least one self-supporting sealing element is coated with an abradable layer on at least one side facing the rotor element concerned.

Said at least one self-supporting sealing element may consist, for example, of the material of the abradable layer or of a layered structure with at least one abradable layer on the outside, intended to be directed towards the end face of one or more rotor elements.

As used here, "self-supporting" means that the sealing element on its own is strong enough to be handled during assembly of the non-lubricated system. Consequently, the sealing element may be manufactured separately and then inserted into the rotor cavity of the housing and, for example, screwed, attached, clamped, locked or otherwise fastened.

As used here, "abradable" refers to a coating or material that wears off in powder form, i.e. where microparticles wear off through contact with the relevant end face of a rotating rotor element of the non-lubricated system. Ideally, these worn microparticles have a number-average particle size that is smaller than 1 µm.

The abradable coating allows for controlled wear during run-in of the system, taking into account the heat generated during run-in, whereby microparticles as defined above wear off. Thus, a quantity of abradable material is removed from the abradable coating, e.g. a 50 µm thick layer of abradable material, until sufficient abradable material has been removed to allow proper rotation of the rotor elements and the remaining abradable material in the abradable coating provides a good seal, i.e. the remaining gap is, for example, smaller than 10 µm.

Providing the abradable coating on or as one or more of the self-supporting sealing element(s), rather than applying an abradable coating to the interior wall of the housing, can simplify the production and/or assembly of the housing, save time and money, and/or provide an improved seal in a non-lubricated system. Furthermore, due to the self-supporting nature of the sealing element (which does not require direct application of an abradable coating to the relevant part of the housing), materials with higher thermal resistance and/or better corrosion resistance can be used for the abradable coating, thus obtaining a seal that is more resistant to high operating temperatures and/or corrosion, which can extend the life of the non-lubricated system. More specifically, the self-supporting element provides corrosion protection for the part of the housing covered by it, which, given the state-of-the-art, provides better protection against corrosion than a coating. The higher thermal resistance that can be achieved ensures applicability at higher temperatures. Higher temperatures in such systems are mainly the result of higher inlet temperatures and/or higher pressure ratios. Consequently, a higher thermal resistance allows for an expansion of the operating range. Within the thermal capabilities of the material, however, the mechanical robustness still determines the service life. The higher thermal resistance can be achieved, for example, by using carbon-based materials as described herein, instead of state-of-the-art organic coatings.

In accordance with embodiments of the invention, each (or the) self-supporting sealing element can have a thickness of preferably at least 1.0 mm, further preferably at least 1.5 mm and further preferably at least 2.0 mm.

In accordance with embodiments of the invention, the abradable coating can have a thickness of at least 100 μm, preferably at least 200 μm and further preferably at least 300 μm.

In accordance with embodiments of the invention, each (or the) self-supporting sealing element can mainly be shaped in the form of a plate.

In accordance with embodiments of the invention, each (or the) self-supporting sealing element can consist of a layered structure, for example a combination of an abradable coating and a support or reinforcement.

In accordance with embodiments of the invention, at least the abradable coating, possibly the entire self-supporting sealing element, can consist of the abradable material. In accordance with preferred embodiments, the abradable material comprises or consists of a carbon matrix. The carbon matrix is at least partly, preferably predominantly, in the form of graphite, e.g. fine-grained graphite. In accordance with embodiments, the degree of graphitization is P1, defined as the probability for adjacent hexagonal carbon layers to have a graphite relationship, greater than 60%, greater than 80% or greater than 95%. X-ray diffraction spectroscopy provides a suitable way to determine the degree of graphitization.

An abradable material in the form of a carbon matrix in accordance with the invention is available through the carbonization (e.g. at high temperature in the presence or absence of oxygen) of a composite, where the composite comprises a polymer matrix and carbon (e.g. in the form of carbon fibers or carbon particles). In embodiments, the polymer is chosen from the group consisting of polyesters, vinyl esters, polyepoxides, polyphenols, polyimides, polyamides, polypropylene, and polyether ether ketone, according to further preference, the polymer is a polyepoxide.

Preferably, an abradable material in the form of a carbon matrix in accordance with the invention is available by also subjecting the carbonized composite as described above to a separate graphite-forming step, which increases the degree of graphitization, such as high temperature treatment. In embodiments, an abradable material in the form of a carbon matrix in accordance with the invention is obtained by impregnating the carbonized composite, which is optionally subjected to a separate graphite-forming step. Impregnation can take place with metals, salts or polymers.

In preferred embodiments, the abradable material comprises more than 80%, 90% or 95% carbon by weight.

The preferred hardness of the abradable material is HR 5/100 between 100 and 120. As used here and known to the average professional, "HR 5/100" refers to the Rockwell Hardness as measured with a ball diameter of 5 mm and a total load of 100 kilogram-force (=980.7 N).

In accordance with embodiments of the invention, at least one rotor element is made of stainless steel.

In accordance with embodiments of the invention, at least one end face of the rotor elements has a contact surface with a roughness Ra>1.0 μm, preferably Ra>2.5 μm. This can be achieved, for example, by roughening the end face using means known to the professional. The rotor elements are preferably made of hardened stainless steel.

In accordance with embodiments of the invention, each (or the) self-supporting sealing element may have one or more openings for the supply and/or exhaust of gas to and/or from the rotor cavity. In other words, these openings form a passage to/from an inlet/outlet port of the housing.

A second aspect in accordance with the invention, whether or not in combination with the other aspects and/or embodiments described here, concerns the provision of a method for assembly of a non-lubricated system. The method comprises the steps: (a) attachment of each (or the) self-supporting sealing element(s) to an interior wall of the stator housing, turning the respective abradable coating away from the respective interior wall; (b) rotatable incorporation of at least one rotor element into the rotor cavity limited by the housing; and (c) run-in of the system in order to partially wear off the abradable coating.

The run-in can be done during a predetermined period of time, e.g. 5 to 15 minutes, and/or within a predetermined temperature range, e.g. 302-572° F. (150-300° C.).

In accordance with embodiments of the invention, the method can comprise a step of roughening at least one end face of at least one rotor element.

In accordance with embodiments of the invention, step (a) can comprise the application of a sealant and/or adhesive between each (or the) self-supporting sealing element and the respective interior wall of the housing. The purpose of this sealant and/or adhesive may be (if necessary) to ensure sealing between the self-supporting sealing element and the interior wall of the housing and/or to bond the self-supporting sealing element to the interior wall.

BRIEF DESCRIPTION OF THE DRAWINGS

The invention will be explained in more detail below using the embodiment examples depicted in accordance with the invention.

FIG. 7 shows a representation in perspective of a part of the housing with a sealing element in accordance with the second embodiment.

DETAILED DESCRIPTION OF THE INVENTION

Figure 1:
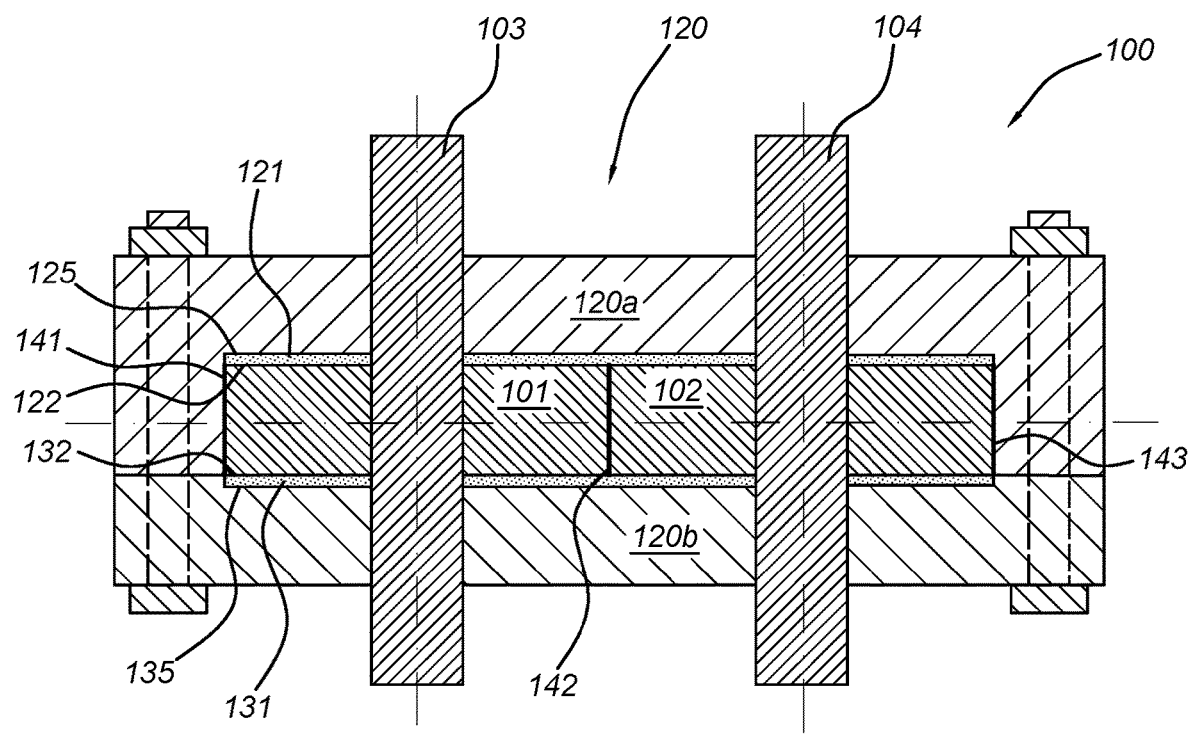
FIG. 1 shows a schematic cross-section of a non-lubricated system in accordance with a first embodiment of the current invention.

The present invention will be described with regard to certain embodiments and with reference to certain drawings, but the invention is not limited thereto and is determined solely by the claims. The described drawings are only schematic and non-restrictive. In the drawings, the size of certain elements may be exaggerated and not drawn to scale for illustrative purposes. The dimensions and relative dimensions do not necessarily correspond to actual practical embodiments of the invention.

Moreover, the terms first, second, third and so forth are used in the description and in the claims to distinguish similar elements and not necessarily to describe a sequential or chronological order. The terms are interchangeable under appropriate circumstances and the embodiments of the invention may be applied in sequences other than those described or illustrated here.

In addition, the terms at the top, bottom, over, under and so forth in the description and claims are used for illustrative purposes and not necessarily to describe relative positions. The terms thus used are interchangeable under appropriate circumstances and the embodiments of the invention described here may be applied in orientations other than those described or illustrated here.

Furthermore, the embodiments, although referred to as "preferred embodiments", should be understood as examples of how the invention may be implemented rather than as limitations of the scope of the invention.

The term "comprising" used in the claims should not be interpreted as being limited to the means or steps mentioned afterwards; it does not exclude other elements or steps. The term should be interpreted as specifying the presence of the referenced features, elements, steps or components, but does not exclude the presence or addition of one or more other features, elements, steps or components, or groups thereof. Consequently, the scope of the expression "an installation comprising means A and B" should not be limited to installations consisting only of components A and B. The meaning is that, with regard to the present invention, only components A and B of the installation are listed, and the claim should further be interpreted as including equivalents of those components.

The systems shown in the figures are non-lubricated systems, or elements thereof, for pumping a gas or gas mixture such as air, for example, a compressor, expander, vacuum pump, etc. Non-lubricated means that no liquid is injected into the gas stream for lubrication, cooling or sealing. Cooling takes place by means of installations or means known to the professional for cooling such systems. The sealing of the rotor elements relative to each other and to the housing of the stator is done as described here, but may also comprise additional provisions for sealing, for example, sealing in relation to the environment. Such additional provisions are known to the professional and are therefore not further described here.

The drive of the rotor elements of the non-lubricated systems shown in the figures and the mutual gearing, which can be fitted to the rotor shafts on the outside of the housing, can be any of the drive and gearing known to the professional and is therefore not further described here.

FIG. 1 shows a non-lubricated system 100 comprising a stationary stator with a housing 120, a first rotor element 101 and a second rotor element 102. The stationary stator comprises a rotor cavity in which the rotor elements are incorporated in such a way that they are rotatable. For example, the rotor elements 101 and 102 are, respectively, a female rotor element and a male rotor element of a claw compressor (see e.g. FIG. 8). The rotor elements 101, 102 comprise, respectively, a rotor shaft 103, 104, which, as shown, can extend through the housing 120 on either side and therefore requires sealing on both sides.

A self-supporting sealing element 121, 131 is provided between the end faces of the rotor elements 101, 102 and the respective interior wall of the housing 120 to form the seal along the end face. These self-supporting sealing elements are provided with an abradable coating 122, 132 on at least one side facing the rotor element. On the opposite side 125, 135, i.e. the side facing the interior wall of the housing, a sealant and/or adhesive can be applied to ensure sealing along that side and/or to fix the position. This can be done during assembly by first applying the sealant and/or adhesive to the interior wall of the housing or the relevant side 125, 135 of the sealing element 121, 131.

Housing 120 is essentially composed of two parts, a first part 120a which forms one side and the jacket of the housing and a second part 120b which forms the opposite side. These parts 120a and 120b are assembled and pressed together by means of bolts through holes provided for that purpose. As shown, parts 120a and 120b each comprise a recess to accommodate the respective self-supporting sealing elements 121, 131.

The self-supporting sealing elements 121, 131 each comprise an essentially plate-like body with the abradable coating 122, 132; in the embodiment shown, this body is made entirely of the abradable material. This abradable material is designed to wear off in powder form when the system is run in, in order to achieve a seal opening of preferably smaller than 10 μm. The abradable material comprises or preferably consists of a carbon matrix as previously described. In order to achieve controlled abrasion of the abradable material during system run-in, the surface of the end faces of the rotor elements should preferably be roughened.

To seal the profile sides of the rotor elements 101, 102 relative to each other and to the inner jacket of the housing 120, abradable coatings 141, 142, 143 have been applied to these profile sides and the inner jacket in a manner known to the professional.

The gas inlet and outlet openings of the system shown in FIG. 1 are not shown. They may, for example, be realized as shown in FIG. 7, in which case the seal element 221 is fitted with openings at the height of the inlet and outlet ports. However, these inlet and outlet ports may also be located in other positions.

Figure 2:
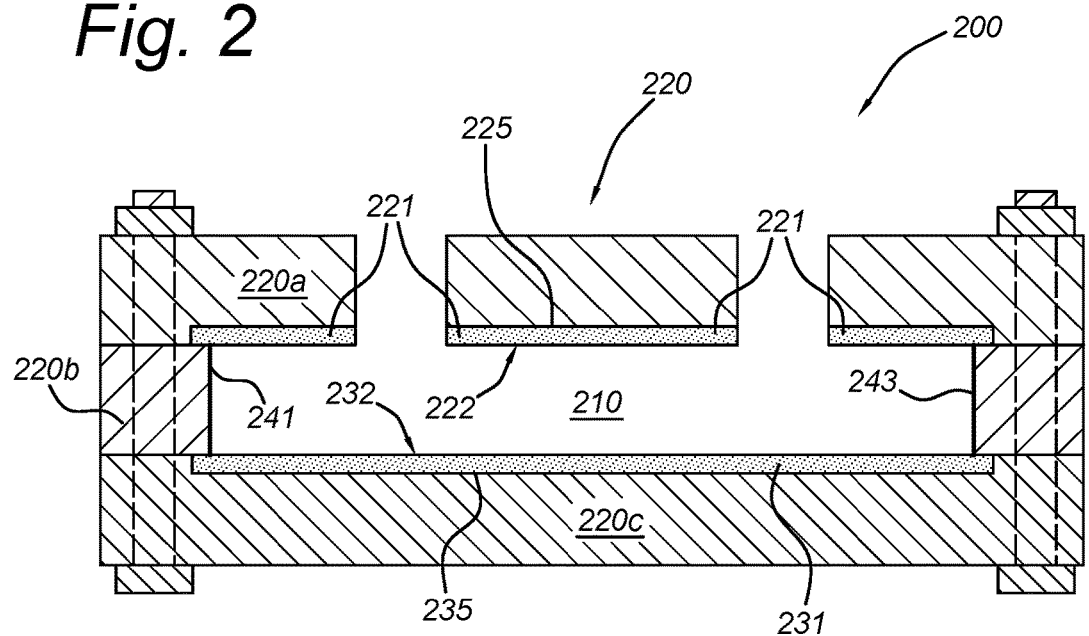
FIG. 2 shows a schematic cross-section of a non-lubricated system in accordance with a second embodiment of the current invention.

FIG. 2 shows a variant of the non-lubricated system 100 in FIG. 1. FIG. 2 does not show the rotor elements for the sake of clarity. The non-lubricated system 200 in FIG. 2 comprises a stator 220 which is essentially composed of three parts, namely side part 220a, jacket part 220b and side part 220c, which are assembled and pressed together by bolts through provided holes. As shown, the side parts 220a and 220c each contain a recess to accommodate the respective self-supporting sealing elements 221, 231. These recesses and the sealing elements 221, 231 placed therein are oversized in relation to the rotor cavity 210, so that the sealing elements 221, 231 extend sideways beyond the jacket part 220b and are clamped to the respective side part 220a, 220c by the jacket part 220b.

In the embodiment in FIG. 2, the rotor shafts (not shown) only extend on one side through the housing. This simplifies the embodiment of the sealing element 231 on the opposite side, which can be a completely closed plate-like body.

Between the end faces of the rotor elements (not shown) and the respective interior wall of the housing 220, a self-supporting sealing element in the form of the plate-like bodies 221, 231 is provided in each case to form the seal along the end faces. These self-supporting sealing elements are coated with the abradable layer 222, 232 on at least one side facing the rotor cavity 210. On the opposite side 225, 235, i.e. the side facing the interior wall of the housing 220a, 220c, a sealant and/or adhesive may be applied to ensure sealing along that side and/or to fix the position. This can be done during assembly by first applying the sealant and/or adhesive to the interior wall of the housing or the relevant side 225, 235 of the sealing element 221, 231.

The self-supporting sealing elements 221, 231 each comprise an essentially plate-like body with the abradable coating 222, 232; in the embodiment shown, this body is made entirely of the abradable material. This abradable material is designed to wear off in powder form when the system is run in, in order to achieve a seal opening of preferably smaller than 10 μm. The abradable material is preferably an abradable material as defined here elsewhere. In order to achieve controlled abrasion of the abradable material during system run-in, the surface of the end faces of the rotor elements should preferably be roughened.

To seal the profile sides of the rotor elements relative to each other and to the inner jacket of the housing 220*b*, abradable coatings 241, 243 have been applied to these profile sides and the inner jacket in a manner known to the professional.

The gas inlet and outlet openings of the system shown in FIG. 2 are shown in FIG. 7; the sealing element 221 is provided with openings 270, 280 at the height of the inlet and outlet ports. However, these inlet and outlet ports may also be located in other positions.

Figure 3:
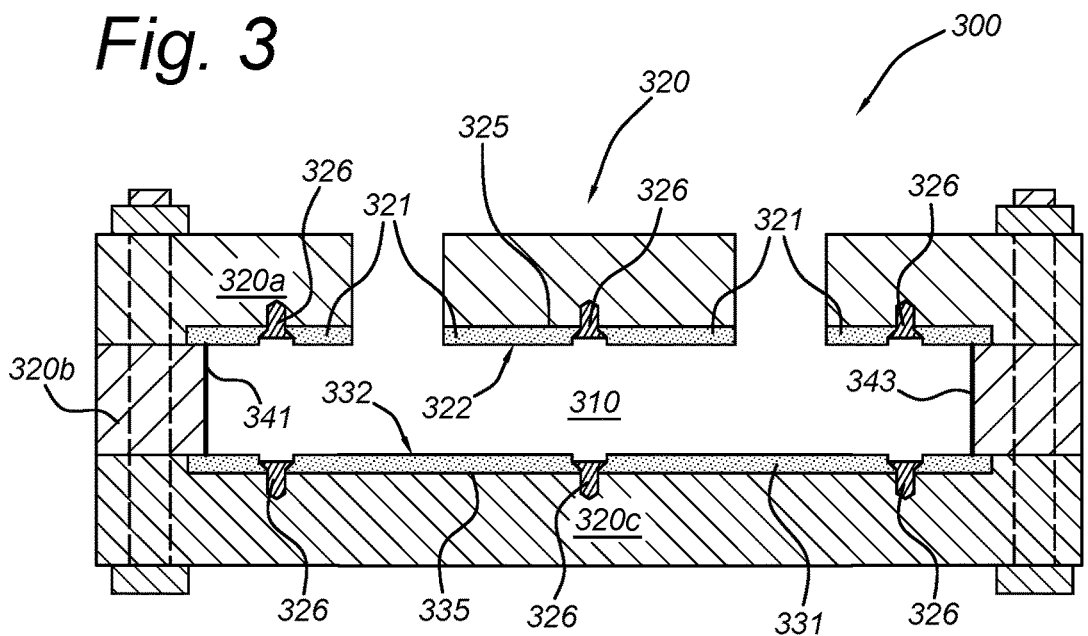
FIG. 3 shows a schematic cross-section of a non-lubricated system in accordance with a third embodiment of the current invention.

FIG. 3 shows a variant of the non-lubricated system 100 in FIG. 1. FIG. 3 does not show the rotor elements for the sake of clarity. The non-lubricated system 300 in FIG. 3 comprises a stator 320 which is essentially composed of three parts, namely side part 320*a*, jacket part 320*b* and side part 320*c*, which are assembled and pressed together by bolts through provided holes. As shown, the side parts 320*a* and 320*c* each contain a recess to accommodate the respective self-supporting sealing elements 321, 331. The dimensions of these recesses and the sealing elements 321, 331 placed therein correspond to those of the rotor cavity 310. The self-supporting sealing elements 321, 331 are mechanically fastened to the respective stator parts 320*a*, 320*c* by means of recessed screws 326, the heads of which are recessed to such an extent that they do not form an obstacle to the abradable coating.

Between the end faces of the rotor elements (not shown) and the respective interior wall of the housing 320, a self-supporting sealing element in the form of the plate-like bodies 321, 331 is provided in each case, to form the seal along the end faces of the rotor elements. These self-supporting sealing elements are coated with the abradable layer 322, 332 on at least one side facing the rotor cavity 310. On the opposite side 325, 335, i.e. the side facing the interior wall of the housing 320*a*, 320*c*, a sealant and/or adhesive may be applied to ensure sealing along that side and/or additionally fix the position. This can be done during assembly by first applying the sealant and/or adhesive to the interior wall of the housing or the relevant side 325, 335 of the sealing element 321, 331.

The self-supporting sealing elements 321, 331 each comprise an essentially plate-like body with the abradable coating 322, 332; in the embodiment shown, this body is made entirely of the abradable material. This abradable material is designed to wear off in powder form when the system is run in, in order to achieve a seal opening of preferably smaller than 10 μm. The abradable material is preferably an abradable material as defined here elsewhere. In order to achieve controlled abrasion of the abradable material during system run-in, the surface of the end faces of the rotor elements should preferably be roughened.

To seal the profile sides of the rotor elements relative to each other and to the inner jacket of the housing 320*b*, abradable coatings 341, 343 have been applied to these profile sides and the inner jacket in a manner known to the professional.

The gas inlet and outlet openings of the system shown in FIG. 3 can be realized as shown in FIG. 7; the sealing element 321 is then provided with corresponding openings at the height of the inlet and outlet ports. However, these inlet and outlet ports may also be located in other positions.

Figure 4:
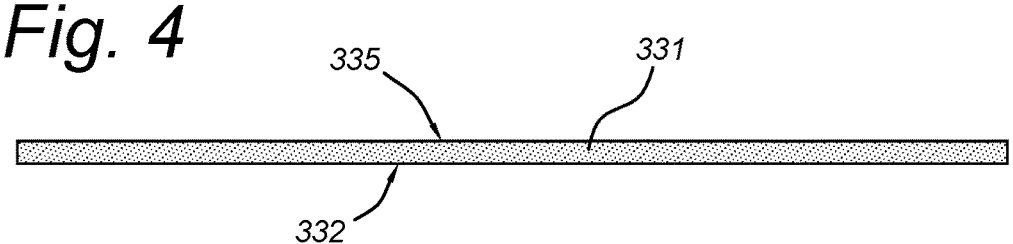
FIGS. 4 to 6 show schematic cross-sections of embodiments of self-supporting sealing elements in accordance with the current invention.
Figure 5:
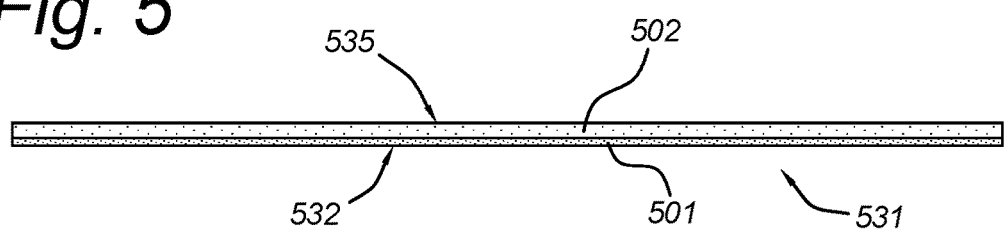
Figure 6:
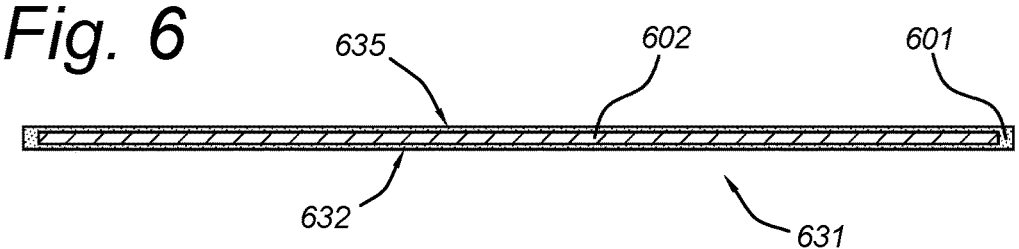

FIGS. 4-6 show alternative embodiments of self-supporting sealing elements 331, 531, 631.

FIG. 4 shows the sealing element 331, also shown in FIG. 3, which comprises a plate-like body made entirely from the abradable material.

FIG. 5 shows a self-supporting sealing element 531 consisting of a carrier 502 on the side facing the housing and an abradable coating 501 on the side facing the rotor elements. The abradable coating 501 is made of an abradable material as defined elsewhere here. Carrier 502 may be made from any carrier material and equipped to make the sealing element 531 self-supporting, in which case the abradable coating 501 may be in the form of an abradable coating. On the other hand, the abradable coating 501 may also be a self-supporting layer in its own right, provided with carrier 502 for further reinforcement, in which case the two layers may be bonded to each other by means of an adhesive or by some other known means.

FIG. 6 shows a self-supporting sealing element 631 with a plate-like body 601 made of the abradable material as defined elsewhere here, in which a reinforcing element or layer 602 is embedded.

FIGS. 8A-8D show a non-lubricated claw compressor during several stages of operation. For example, the claw compressor may be designed in accordance with the embodiments shown in FIGS. 1-7. FIG. 8 shows the inlet port 870 at the top and the outlet port 880 in the center, through the corresponding self-supporting sealing element. The claw compressor comprises two rotor elements, a male 801 and a female 802 rotor element, which rotate in the direction indicated by arrows.

Figure 8A:
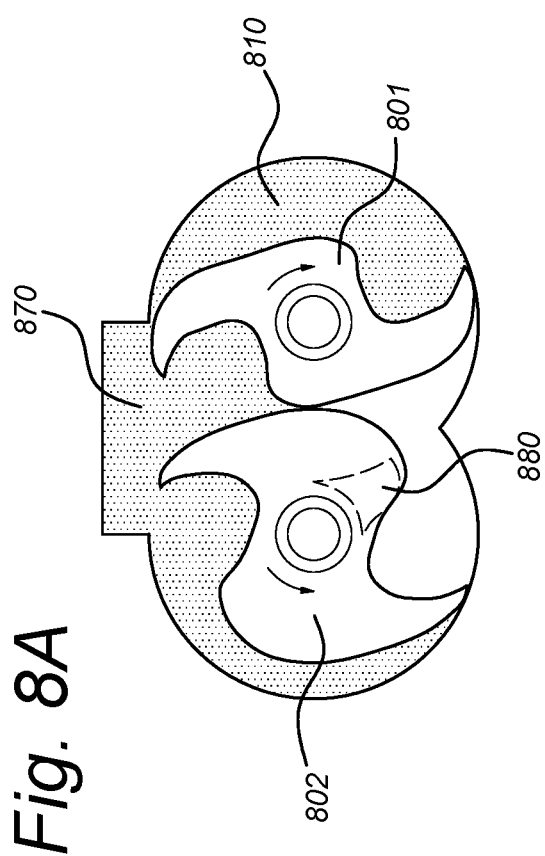
FIGS. 8A-D schematically show the operation of a claw compressor in accordance with an embodiment of the invention in several steps.

In a first stage of operation, shown in FIG. 8A, atmospheric air, for example, is drawn in through the inlet port 870 toward the rotor cavity (compression chamber) by the rotation of the rotor elements 801, 802.

Figure 8B:
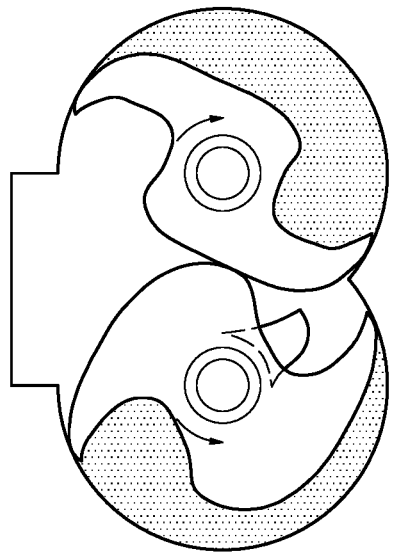

In a second stage of operation, shown in FIG. 8B, the air that is drawn in, is trapped between the gears or claws of the rotor elements 801, 802 and the stator. The self-supporting sealing elements provide sealing along the end faces of the rotor elements 801, 802.

Figure 8C:
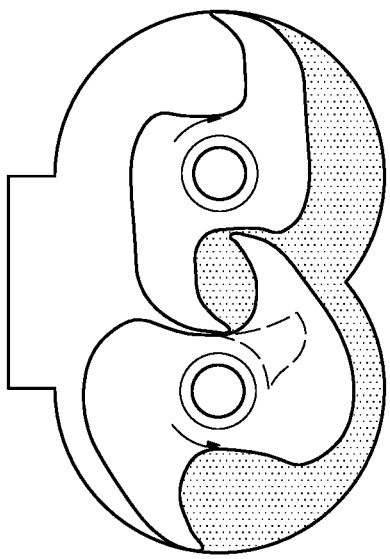

In a third stage of operation, shown in FIG. 8C, the gears or claws of the rotor elements 801, 802 move towards each other and the enclosed free space is reduced, resulting in compression of the trapped air. Here, too, the self-supporting sealing elements provide sealing along the end faces of the rotor elements 801, 802.

Figure 8D:
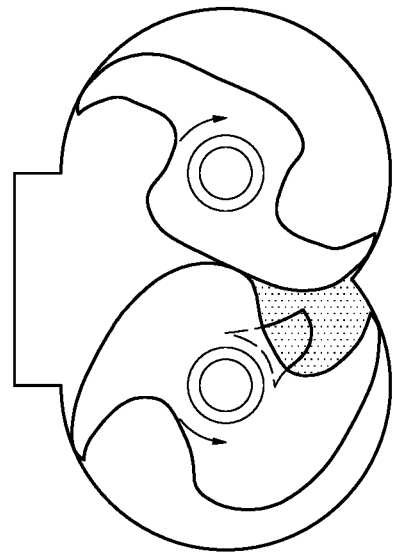

In a fourth stage of operation, shown in FIG. 8D, the rotor elements 801, 802 are rotated even further, whereby the female rotor element 801 rotates past the outlet port 880 and the compressed air is discharged through it. In doing so, the discharged air flows through the outlet port 880 in the respective sealing element.

Operation in accordance with FIGS. 8A-D is also used for running in the system. Here the rotor elements 801, 802 are rotated during a run-in period of e.g. 5 to 15 min, where the temperature of the system is controlled to a temperature range e.g. 302-572° F. (150-300° C.), depending on the expected operating temperature during normal system operation. During this run-in process, an amount of material is worn off from the abradable coating. The system can e.g. initially be assembled with an excess of 50 μm for each abradable layer. As described here, the abradable material is selected to wear off in powder form when the system is run in, i.e. all worn particles are microparticles of an order of magnitude of 1 µm or smaller. In this way, a seal can be obtained with a remaining seal opening that is smaller than 10 µm.

Figure 9A:
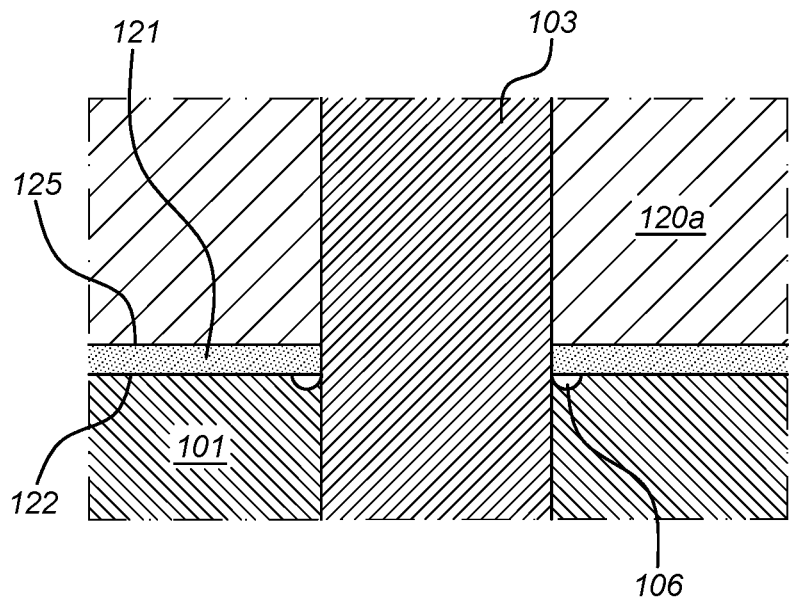
FIGS. 9A-B show a detail of FIG. 1.
Figure 9B:
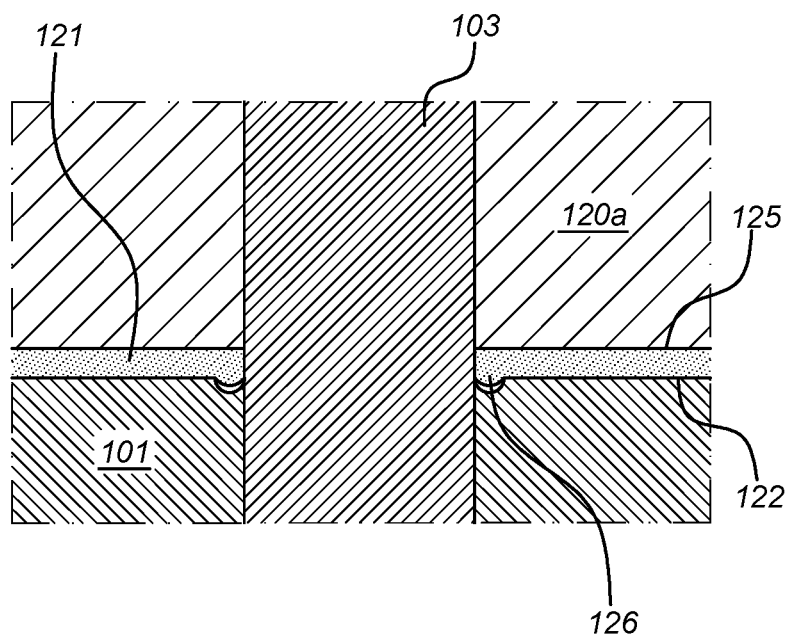

FIGS. 9A and 9B show a detail of the embodiment in accordance with FIG. 1, respectively before and after run-in. The run-in is based on an equal abrasive action of the rotor surface of the rotor 101 on the surface of the abradable coating 122, with no preferential direction of wear. In practice, the rotor 101 often forms a single component with the rotor shaft 103, where a groove 106 is present where the shaft merges into the rotor body. The presence of this groove is inherent to the rotor design to avoid stress concentrations at the beginning of the shaft. At the location of this groove, which is flush with the shaft and concentric, no material is worn off during run-in, resulting in the formation on sealing element 121 of a ring 126 of non-worn material which will be partially be located in the groove 106 of the rotor element after the run-in process. This provides an additional gas seal around the shaft. This ring, which occurs naturally during the run-in process, provides an additional gas seal at the level of this notch in the rotor, without the need for additional steps and/or means during the manufacturing process of the rotor elements and/or the abradable sealing element.

The invention claimed is:

1. A non-lubricated system for pumping a gas, comprising a stationary stator with a housing comprising a rotor cavity and at least one rotatable rotor element incorporated within the rotor cavity, where the stator further comprises at least one self-supporting sealing element, incorporated in the rotor cavity between an end face of at least one of the rotor elements and an interior wall of the housing, to form a seal along the end face, wherein an abradable coating is on at least one side facing the corresponding rotor element of the at least one self-supporting sealing element, wherein at least the abarable coating consists of a carbon matrix.

2. The non-lubricated system in accordance with claim 1, wherein the at least one self-supporting sealing element has a thickness of at least 1.0 mm.

3. The non-lubricated system in accordance with claim 1, wherein the abradable coating has a thickness of at least 100 µm.

4. The non-lubricated system in accordance with claim 1, wherein the at least one self-supporting sealing element is mainly plate-like.

5. The non-lubricated system in accordance with claim 1, wherein the at least one self-supporting sealing element consists of a layered structure.

6. The non-lubricated system in accordance with claim 1, wherein the carbon matrix has a degree of graphitization P1 of more than 60%, more than 80% or more than 95%.

7. The non-lubricated system in accordance with claim 1, wherein the abradable coating has a hardness HR 5/100 between 100 and 120.

8. The non-lubricated system in accordance with claim 1, wherein at least one end face of at least one of the rotor elements has a contact surface with a roughness Ra>1.0 µm.

9. A non-lubricated system for pumping a gas, comprising a stationary stator with a housing comprising a rotor cavity and at least one rotatable rotor element incorporated within the rotor cavity, where the stator further comprises at least one self-supporting sealing element, incorporated in the rotor cavity between an end face of at least one of the rotor elements and an interior wall of the housing, to form a seal along the end face, wherein an abradable coating is on at least one side facing the corresponding rotor element of the at least one self-supporting sealing element, wherein at least one end face of at least one of the rotor elements is notched around a rotor shaft of the rotor element and wherein the abradable coating of the at least one self-supporting sealing element present there comprises a ring extending into the notch.

10. The non-lubricated system in accordance with claim 1, wherein the at least one self-supporting sealing element comprises one or more openings for the supply and/or exhaust of the gas.

11. The non-lubricated system in accordance with claim 1, wherein the system is a compressor, expander or vacuum pump.

12. A self-supporting sealing element according to claim 1, configured for use in a non-lubricated system for pumping the gas.

13. A method for assembling a non-lubricated system in accordance with claim 1, comprising the following steps:
attaching the at least one self-supporting sealing element to the interior wall of the housing of the stator, wherein the respective abradable coating is turned away from the respective interior wall;
incorporating rotatably the at least one rotor element in the rotor cavity bounded by the housing; and
running-in the system to partially wear down the abradable coating.

14. The method in accordance with claim 13, further comprising a step of roughening at least one end face of at least one rotor element.

15. The method in accordance with claim 13, wherein the attaching comprises the application of a sealant and/or adhesive between the at least one self-supporting sealing element and the respective interior wall of the stator housing.

16. The method in accordance with claim 13, wherein the end face of the at least one of the rotor elements is notched around a rotor shaft of the rotor element and wherein during the running-in, as a result of the run-in, a ring is formed on the abradable coating of the self-supporting sealing element present there, which extends into the notch.

17. The non-lubricated system in accordance with claim 2, wherein the at least one self-supporting sealing element has a thickness of at least 1.5 mm.

18. The non-lubricated system in accordance with claim 17, wherein the at least one self-supporting sealing element has a thickness of at least 2.0 mm.

19. The non-lubricated system in accordance with claim 3, wherein the at least one self-supporting sealing element has a thickness of at least 200 µm.

20. The non-lubricated system in accordance with claim 19, wherein the at least one self-supporting sealing element has a thickness of at least 300 µm.

21. The non-lubricated system in accordance with claim 1, wherein the entire at least one self-supporting sealing element consists of a carbon matrix.

22. The non-lubricated system in accordance with claim 21, wherein the carbon matrix has a degree of graphitization P1 of more than 60%, more than 80% or more than 95%.

23. The non-lubricated system in accordance with claim 8, wherein at least one end face of at least one of the rotor elements has a contact surface with a roughness Ra>2.5 µm.

* * * * *